3,583,993
PLANT GROWTH REGULATING SUBSTANCES, LYCORICIDINS
Toshihiko Okamoto, Tokyo, Yoshihiko Torii, Chiba-shi, and You Isogai, Tokyo, Japan, assignors to Shionogi & Co., Ltd., Osaka, Japan
No Drawing. Filed Mar. 18, 1968, Ser. No. 714,105
Claims priority, application Japan, Mar. 28, 1967, 42/19,735, 42/19,736
Int. Cl. C07d 39/02
U.S. Cl. 260—287     9 Claims

ABSTRACT OF THE DISCLOSURE

Compounds of the formula:

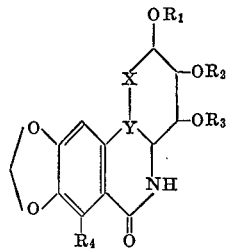

wherein $R_1$, $R_2$ and $R_3$ each is hydrogen or acyl, $R_4$ is hydrogen, hydroxyl, alkoxy or acyloxy and —X—Y< is —$CH_2$—CH< or —CH=C<, which are obtained by extracting a plant belonging to the Family Amaryllidaceae with a solvent and, if necessary, subjecting the extracted compound to acylation, alkylation and/or hydrogenation, and are useful as plant growth regulating agents.

---

This invention relates to new compounds having plant growth regulating activity. More particularly, it relates to lycoricidin A, lycoricidin B and related compounds, which may be represented by the following formula:

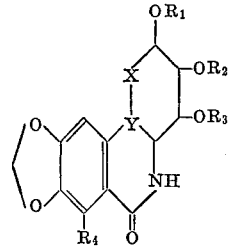

wherein $R_1$, $R_2$ and $R_3$ each is a hydrogen atom or an acyl group (e.g. acetyl, propionyl, butyryl, benzoyl, methoxycarbonyl, ethoxycarbonyl), $R_4$ is a hydrogen atom, a heydroxyl group, an alkoxyl group (e.g. methoxy, eth-
a hydroxyl group, an alkoxyl group (e.g. methoxy, ethoxy, propoxy, butoxy) or an acyloxy group and —X—Y< is a group of —$CH_2$—CH< or a group of —CH=C<.

Further, this invention relates to a method for producing the above identified compounds. It also relates to a plant growth regulating composition containing at least one of the above identified compounds as an active ingredient.

It has been well known that various kinds of so-called phenanthridine alkaloids are contained in plants belonging to the Family Amaryllidaceae. On the contrary, non-alkaloidal components of those plants have been scarcely studied. The present inventors have succeeded in the isolation of lycoricidin A and lycoricidin B as non-alkaloidal components of the said plants and found that these newly isolated compounds and some related compounds derived from them have marked plant growth regulating activity. And, their chemical structures have also been elucidated; that is, lycoricidin A can be represented by the foregoing formula wherein $R_1$, $R_2$ and $R_3$ each is a hydrogen atom, $R_4$ is a hydroxyl group and —X—Y< is the —CH=C< group and lycoricidin B can be represented by the foregoing formula wherein $R_1$, $R_2$, $R_3$ and $R_4$ each is a hydrogen atom and —X—Y< is the —CH=C< group. The present invention has been accomplished on the bases of these discoveries.

Accordingly, a fundamental object of the invention is to provide novel compounds, lycoricidin A, lycoricidin B and related compounds. Another object of the invention is to provide novel compounds having plant growth regulating activity. A further object of the invention is to provide a method for producing those compounds having plant growth regulating activity. A still further object of the invention is to provide a plant growth regulating composition containing at least one of lycoricidin A, lycoricidin A, lycoricidin B and related compounds. These and other objects of the present invention will be apparent to those conversant with the art to which the present invention concerns from the following detailed descriptions.

According to the present invention, lycoricidin A and lycoricidin B can be obtained by extraction of a plant belonging to the Family Amaryllidaceae with a suitable solvent followed by conventional purification procedures (e.g. chromatography, recrystallization). Examples of the plant to be used as raw materials include Amaryllis belladonna L., Buphane disticha Herb., Clivia miniata Benth., Cooperia Drummondii Herb., Cooperia pedunculata, Crinum asiaticum L., Crinum asiaticum L. var. japonicum Baker, Crinum filmifolim Baker, Crinum giganteum Andr., Crinum pratense Herb., Crinum scabrum Herb., Curculigo orchioides Gaerth., Cyrtanthus pallidus Smis., Eucharis grandiflora Blank., Eurycles amboinensis Loud., Eurycles sylvestris Salisb., Galanthus woronowii Losinsk, Hippeastrum hybridum Host., Hippeastrum reginae Herb., Hymenocallis littoralis Salisb., Hypoxis aurea Lour., Lycoris albiflora Koidz., Lycoris aurea Herb., Lycoris radiata Herb., Lycoris sanguinea Maxim., Lycoris squamigera Maxim., Narcissus jonguilla L., Narcissus orientalis L., Narcissus poeticus L., Narcissus pseudonarcissus L., Narcissus Tazetta L., Pancratium illyricum L., Polianthe tuberosa L., Sprekelia formosissima Herb. App., Ungernia Sewertzovii Rgl., Ungernia tadshikorum Vved., Zephyranthes candida Herb., Zephyranthes carinata Herb., Zephyranthes rosea Lindl., Zephyranthes taxana Herb., etc. Among these, a plant belonging to the Genus Lycoris, especially Lycoris radiata Herb., is preferred. Although the whole plant can be used for the extraction, the objective components are predominantly contained in the subterranean parts of the plant. Further, it is preferred to use the plant collected before flowering, but after sufficient growth.

Dried or undried plant is subjected to a conventional extraction procedure. Illustrative of the extraction solvents are water, lower alkanols (e.g. methanol, ethanol, propanol, butanol, pentanol), lower alkyl acetates (e.g. methyl acetate, ethyl acetate, amyl acetate), halogenoalkanes (e.g. methylene chloride, chloroform, trichloroethane), organic bases (e.g. pyridine, picoline, diethylamine, triethylamine, ethanolamine) and the like. The extraction can be effected at a wide range of temperature from room temperature (about 15° C.) to reflux temperature of the solvent. After evaporation of the solvent, the crude extracts are subjected to a conventional purification procedure (e.g. chromatography, recrystallization). One of the preferred purification procedures comprises applying the crude extracts to a silica gel column and eluting with a suitable solvent system such as methanol-ethyl acetate (5:95). Alternatively, since the objective components behave as an acidic substance, they may be extracted with an alkaline aqueous solution. The aqueous extract is acidified and extracted with a suitable water-immiscible solvent such as ethyl acetate or butanol. But this procedure encounters sometimes serious difficulty, because the objective components are soluble in water.

Thus, lycoricidin A and lycoricidin B are isolated as colorless crystalline substances, and they may be, if desired, converted into the related compounds. The related compounds include lycoricidin A tetraacylates, lycoricidin A alkyl ether, lycoricidin A triacylates, lycoricidin A triacylate alkyl ethers, lycoricidin B triacylates, dihydrolycoricidin A, dihydrolycoricidin B, dihydrolycoricidin A tetraacylates, dihydrolycoricidin A alkyl ether, dihydrolycoricidin A triacylates, dihydrolycoricidin A triacylate alkyl ethers, dihydrolycoricidin B triacylates and the like. The acylates and the alkyl ethers can be prepared by conventional acylations with acylating agents and conventional alkylations with alkylating agents, respectively. The dihydro-compounds can be prepared by conventional catalytic reductions.

The thus obtained compounds of the present invention show marked plant growth regulating activity, and are useful as plant growth regulating agents, for example, for the agricultural purposes.

For example, the plant growth regulating effects of some typical compounds of the present invention were confirmed by the Straight Growth Tests on *Avena coleoptiles* and *Oryza sativa* L., the summarized results of which are shown in the following Table 1, in contrast with a known agent, PCP.

TABLE 1

| Test plant | Test compound | Concentration (p.p.m.) | Length of elongation (mm.) |
|---|---|---|---|
| *Avena coleoptiles* | Control | 0 | 8.07 |
| | Lycoricidin A | 100 | 6.26 |
| | | 10 | 6.40 |
| | | 1 | 6.83 |
| *Oryza sativa* L. | Control | 0 | 2.62 |
| | Lycoricidin A | 100 | --- |
| | | 10 | 1.83 |
| | | 1 | 2.05 |
| | Lycorididin B | 100 | --- |
| | | 10 | 2.26 |
| | | 1 | 2.52 |
| | Lycoricidin A tetraacetate | 33 | 2.23 |
| | Lycoricidin A triacetate | 100 | --- |
| | | 10 | 2.61 |
| | | 1 | 2.60 |
| | PCP | 100 | --- |
| | | 10 | 2.24 |
| | | 1 | 2.80 |

Note.—Means a complete inhibition of elongation. A piece of the test plant was floated on an aqueous solution of the test compound, and the lentgh of elongation was measured after 24 hours cultivation in the case of *Avena coleoptiles* or after 4 days cultivation in the case of *Oryza sativa*.

Further, it has been provided that lycoricidin A shows selective inhibition of germination of plant seeds. The germination-inhibitory activity of lycoricidin A was determined for *Oryza sativa* L., *Triticum aestivim* L., *Allium fistulosum* L., *Brassica campestris* L., *Echinochloa Crus galli* P. Beauv., *Digitaria sanguinalis* L. and *Polygonum longisetum* DeBruyn., and the results are shown in the following Table 2 as minimum germination-inhibitory concentrations.

Test plant: Minimum inhibitory concentration (p.p.m.)
- *Oryza sativa* L. _____ 2,500
- *Triticum aestivim* L. _____ 1,000
- *Alium fistulosum* L. _____ 500
- *Brassica campestris* L. _____ 500
- *Echinochloa Crus-galli* P. Beauv. _____ 250
- *Digitaria sanguinalis* L. _____ 50
- *Polygonum longisetum* DeBruyn. _____ 2,500

Note.—Seeds of the test plant were immersed for ten minutes in aqueous solutions of different concentrations of lycoricidin A and sowed on soil in polyethylene cups. Observing germinations of the seeds, the minimum inhibitory concentrations were determined.

It has been also proved that lycoricidin A shows selective inhibition of elongation of plants. The elongation-inhibitory activity of lycoricidin A was determined in *Oryza sativa* L., *Triticum aestivim* L., *Allium fistulosum* L., *Brassica campestris* L. *Echinochloa Crus-galli* P. Beauv., *Digitaria sanguinalis* L. and *Polygonum longisetum* DeBruyn, and the results are shown in the following Table 3, as minimum elongation-inhibitory concentrations.

Test plant: Minimum inhibitory concentration (p.p.m.)
- *Oryza sativa* L. _____ 1,000
- *Triticum aestivim* L. _____ 1,000
- *Allium fistulosum* L. _____ 50
- *Brassica campestris* L. _____ 250
- *Echinochloa Crus-galli* P. Beauv. _____ 25
- *Digitaria sanguinalis* L. _____ 25
- *Polygonum longisetum* DeBruyn. _____ 1

Note.—Seeds of the test plant were sowed on soil in polyethylene cups. Aqueous solutions of different concentrations of lycoricidin A were applied to the test plant with a brush, when the plant grew to the following length: *Oryza sativa* L.: 3.2 cm.; *Triticum aestivim* L.: 19.7 cm.; *Allium fistulosum* L.: 5.9 cm.; *Brassica campestris* L.: 2.5 cm.; *Echinochloa Crus-galli* P. Beauv.: 7.1 cm.; *Digitaria sanguinalis* L.: 2.1 cm.; *Polygonum longisetum* DeBruyn.: 2.1 cm. Observing elongations of the plant, the minimum inhibitory concentrations were determined.

As illustrated above, the compounds of the present invention have plant growth regulating activity and also germination-inhibitory activity. And, certain relaxation and/or prolongation of those activities are observed in the related compounds, especially acylates, alkyl ethers, dihydrocompounds, etc. They can be used as selective plant growth regulating agents or herbicides. They can be applied in a variety of per se conventional ways, eg. in the form of an aqueous solution at an effective concentration, e.g. form 1 to 10,000 parts per million. However, they can also be formulated and distributed on the treatment area in composition form with a wetting agent or adhesive agent or a colloidal material such as soluble resin or soluble gum, or soluble polymer such as polyvinyl alcohol. They can also be formulated as powders or pastes in admixture with inert carriers such as talc, wheat flour, clay or terra alba and/or with the aid of lanolin, olive oil, parafin oil or hydrogenated oil.

The following examples will illustrate presently-preferred embodiments of the present invention, but it is to be understood that they are given for purpose of illustration only and not of limitation. All abbreviations have conventional significances in the field to which the present invention concerns.

EXAMPLE 1

Undried whole plant (63 kg.) of *Lycoris radiata* Herb. is homogenized together with methanol (100 L), the mixture is allowed to stand at room temperature overnight, and centrifuged. The supernatant solution is evaporated under reduced pressure to leave an aqueous solution (20 L). The aqueous solution is extracted repeatedly with ethyl acetate until the ethyl acetate extract becomes almost colorless. The extracts are combined and concentrated under reduced pressure to a volume of 3.5 L. The concentrated solution is extracted with 5% sodium hydrogen carbonate, the aqueous layer is acidified to litmus paper with concentrated hydrochloric acid, and extracted with ethyl acetate (14 L). The ethyl acetate extracts is evaporated under reduced pressure to leave a crude acidic material (21.8 g.), which is subsequently dissolved in a mixture of pyridine (50 ml.) and methanol (10 ml.). To the solution is added neutral silica gel (30 g.), the solvent is evaporated under reduced pressure and further dried for one day under reduced pressure. Thus obtained silica gel having adsorbed the crude materials is piled on the top of a chromatography column which is prepared with water-saturated chloroform and silica gel (850 g.) pretreated with water. Eluates (2.318 g.) with the solvent containing 10% of methanol is treated with methanol (100 ml.) under heating. After cooling, the mixture is filtered to obtain a methanol-insoluble solid (1.673 g.), which gives a single spot of a characteristic yellow fluorescence with a UV-lamp at Rf 0.4 on TLC with silica gel and ethyl acetate containing 20% of methanol. Recrystallization from water gives lycoricidin A ($R_1=R_2=R_3=H$; $R_4=OH$; $-X-Y<=-CH=C<$)

(1.134 g.) as colorless needles, which are deformed at 199° C., gradually colored from yellow to brown, and finally decomposed into a tar at higher than 216° C.

IR $\nu_{max.}^{KBr}$ cm.$^{-1}$

3600–2400(OH), NH), 1670(CO), 1650(C=C), 1625, 1600 (aromatic ring).

UV $\lambda_{max.}^{EtOH}$ m$\mu$ ($\epsilon$)

252(25,600), 303(6,400), 330(sh.).

Analysis.—Calcd. for $C_{14}H_{13}NO_7 \cdot H_2O$ (percent): 51.58; H, 4.62; N, 4.29. Found (percent): C, 51.56; H, 4.80; N, 4.56.

The methanol-soluble part and the mother liquor of the recrystallization of lycoricidin A are combined and adsorbed on silica gel (5 g.). The silica gel is piled on the top of a chromatography column which is prepared with silica gel (70 g.) and ethyl acetate. Collecting each 50 ml. of fractions, the fractions (Nos. 14–17) give a solid (80 mg.), which gives a single spot of a violet fluorescence at Rf 0.3 on TLC with silica gel and ethyl acetate containing 20% of methanol. Recrystallization from methanol gives lycoricidin B ($R_1=R_2=R_3=R_4=H$;

$-X-Y<=-CH=C<$)

as colorless cubic crystals, M.P. 214.5–215.5° C. (decomposition).

IR $\nu_{max.}^{KBr}$ cm.$^{-1}$

3600–2400 (OH, NH), 1660(CO), 1610.

UV $\lambda_{max.}^{EtOH}$ m$\mu$ ($\epsilon$)

241(21,300), 300(5,000), 325 (sh').

Analysis.—Calcd. for $C_{14}H_{13}NO_6$ (percent): C, 57.73; H, 4.46. Found (percent): C, 57,12; H, 4.53.

EXAMPLE 2

To an aqueous solution (10 L) taken from the residual aqueous solution (20 L) of the ethyl acetate-extraction of the aqueous solution obtained from the methanol extract of the plant in the Example 1, is added active carbon (1 kg.), the mixture is allowed to stand for 4 hours with occasional agitations, and filtered together with Celite (500 g.). To the active carbon is added acetone (4 L) and the mix is allowed to stand at room temperature overnight. This procedure is repeated four times and the combined acetone solution is evaporated under reduced pressure to give a viscous residue (73.45 g.). The residue is dissolved in water (400 ml.) and extracted with butanol (700 ml.). The butanol extract is evaporated under reduced pressure to give a viscous residue (5.3 g.). The residue is adsorbed on silica gel (10 g.), piled on the top of a chromatography column which is prepared silica gel (100 g.) and ethyl acetate, and eluted with ethyl acetate containing 5% of methanol. Collecting each 100 ml. of fractions, the fractions (Nos. 10–18) give a residue (479 mg.). The residue is treated with methanol (2.5 ml.) under heating. After cooling, the mixture is filtered to give a solid (89.8 mg.), of which recrystallization from methanol gives lycoricidin B (18.3 mg.).

EXAMPLE 3

Undried whole plant (100 kg.) of Lycoris radiata Herb. is treated in a similar manner to the Example 1, i.e. the plant is extracted with methanol, the methanol extract is evaporated, the residual aqueous solution is extracted with ethyl acetate and the ethyl acetate extract is evaporated. The residue (210 g.) is added with ethyl acetate (1 L) and the mixture is heated with stirring. After cooling, the insoluble materials (21.74 g.) are collected by filtration. A portion (4.11 g.) of thus collected materials is dissolved in methanol and adsorbed on silica gel. The silica gel is piled on the top of a chromatography column which is prepared with silica gel (200 g.) and ethyl acetate, and eluted with ethyl acetate containing 5% of methanol. Collecting each 500 ml. of fractions, the fractions (Nos. 4–7) are combined and purified in a similar manner to the Example 1 to give lycoricidin A (416 mg.). The fractions (Nos. 9–11) are combined and purified to give lycoricidin B (319 mg.).

EXAMPLE 4

To a solution of lycoricidin A (78 mg.) in methanol (80 ml.) is added 30% palladium-carbon (Pd=30 mg.), and the mixture is subjected to a catalytic hydrogenation for 8 hours at room temperature. After removal of the catalyst, the filtrate is evaporated and the residue is crystallized from methanol to give dihydrolycoricidin A ($R_1=R_2=R_3=H$; $R_4=OH$; $-X-Y<=-CH_2-CH<$) (46 mg.) as colorless cubic crystals, M.P. 167–169° C.

IR $\nu_{max.}^{KBr}$ cm.$^{-1}$

3600–2400 (OH,NH), 1670(CO), 1625, 1600 (aromatic ring).

UV $\lambda_{max.}^{EtOH}$ m$\mu$ ($\epsilon$)

234(22,100), 279(7,200), 310 (sh.).

EXAMPLE 5

A mixture of lycoricidin A (82.2 mg.), acetic anhydried (2.5 ml.) and pyridine (2 ml.) is allowed to stand at room temperature overnight. After removal of the solvents, the residue is subjected to chromatography on silica gel (500 g.) to obtain lycoricidin A tetraacetate ($R_1=R_2=R_3=COCH_3$; $R_4=OCOCH_3$; $-X-Y<=-CH=C<$) (45 mg.) and lycoricidin A triacetate ($R_1=R_2=R_3=COCH$; $R_4=OH$; $-X-Y<=-CH=C<$) (17.3 mg.)

Lycoricidin A tetraacetate: coloreless needles, when recrystallized from hexane-methylene chloride, M.P. 229–231° C.

Analysis.—Calcd. for $C_{22}H_{21}NO_{11}$ (percent): C, 55.76; H, 4.44; N, 2.93. Found (percent). C, 54.73; H, 4.38; N, 2.96

IR $_{max.}^{KBr}$ cm.$^{-1}$

3280(NH), 1790–1725(CO, 1670(CO), 1630.

UV $\lambda_{max.}^{EtOH}$ m$\mu$ ($\epsilon$)

245(36,700), 303(7,300), 325 (sh.).

Lycoricidin A triacetate: colorless needles, when recrystallized from hexane-methylene chloride, M.P.200–201° C.

IR $\nu_{max.}^{KBr}$ cm.$^{-1}$

3300(NH), 1775–1725(CO), 1676(CO), 1650(C=C), 1625, 1600(aromatic ring).

UV $\lambda_{max.}^{EtOH}$ m$\mu$ ($\epsilon$)

252(18,200), 310(4,200), 335 (sh.).

EXAMPLE 6

To a solution of lycoricidin A (108 mg.) in methanol (100 ml.) is added an excessive amount of ethereal solution of diazomethane and the mixture is allowed to stand at 0° C. for 4 days. After removal of the solvent below 40° C. under reduced pressure, the residue is crystallized from methanol to give lycoricidin A methyl ether ($R_1=R_2=R_3=H$; $R_4=OCH_3$; $-X-Y<=-CH=C<$) (54 mg) as colorless cubic crystals, M.P. 229–231° C. (decomposition)

IR $\nu_{max.}^{KBr}$ cm.$^{-1}$

3600–3000(OH,NH), 1672(CO), 1650(C=C), 1605(aromatic ring).

UV $\lambda_{max.}^{EtOH}$ m$\mu$ ($\epsilon$)

246(30,300), 296(5,400), 325 (sh.).

EXAMPLE 7

To a solution of lycoricidin B (64.8 mg.) in methanol (30 ml.) is added 10% palladium-carbon, and the mixture is subjected to a catalytic hydrogenation for 50 minutes at room temperature. After removal of the catalyst, the filtrate is evaporated and the residue is crysallized from methanol-ethyl acetate to give dihydrolycoricidin B ($R_1=R_2=R_3=R_4=H$; —X—Y< =—$CH_2$—CH<) (34.6 mg.) as colorless crystals, M.P. 281–283° C. (decomposition). IR $\nu_{max.}^{KBr}$ cm.$^{-1}$ 3600–2900, 1665, 1640(CO), 1610(aromatic ring).

UV $\lambda_{max.}^{EtOH}$ m$\mu$ ($\epsilon$)

221(25,800), 260(4,400), 270(sh.), 302(5,500).

EXAMPLE 8

A mixture of lycoricidin B (48.5 mg.), acetic anhydride (1.5 ml.) and pyridine (2 ml.) is allowed to stand at room temperature overnight. After removal of the solvents, the residue is crystallized from methanol to give lycoricidin B triacetate ($R_1=R_2=R_3=COCH_3$; $R_4=H$; —X—Y< =—CH=C<) (37.7 mg.) as colorless needles. M.P. 201–202° C.

IR $\nu_{max.}^{KBr}$ cm.$^{-1}$

3360(NH), 3230(NH), 1790–1725(CO), 1675(CO), 1610.

What is claimed is:

1. A compound of the formula

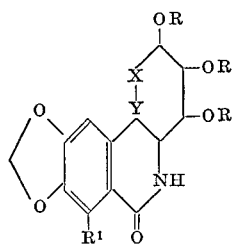

wherein R is a member selected from the group consisting of hydrogen, lower alkanoyl having up to 4 carbon atoms, benzoyl and alkoxycarbonyl having up to 3 carbon atoms, R' is a member selected from the group consisting of hydrogen, hydroxy, lower non-cyclic alkoxy having up to 4 carbon atoms and acetoxy and —X—Y< is a member selected from the group consisting of —$CH_2$—CH< and —CH=C<.

2. A compound according to claim 1, namely lycoricidin A of the formula:

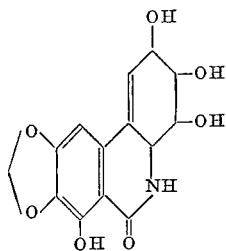

3. A compound according to claim 1, namely lycoricidin B of the formula:

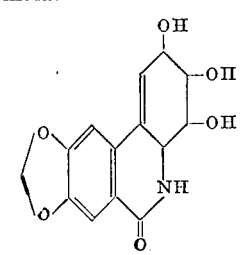

4. A compound according to claim 1, namely lycoricidin A tetraacetate of the formula:

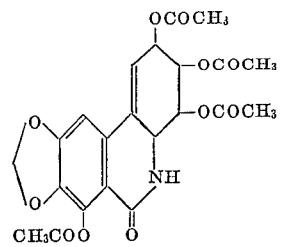

5. A compound according to claim 1, namely lycoricidin A triacetate of the formula:

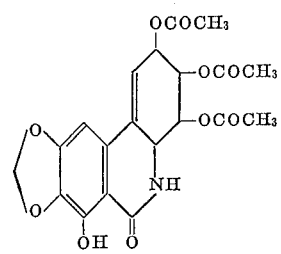

6. A compound according to claim 1, namely lycoricidin A methyl ether of the formula:

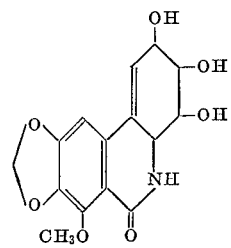

7. A compound according to claim 1, namely dihydrolycoricidin A of the formula:

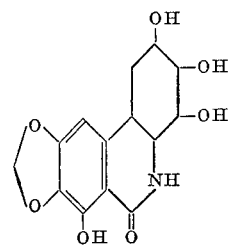

8. A compound according to claim 1, namely lycoricidin B triacetate of the formula:

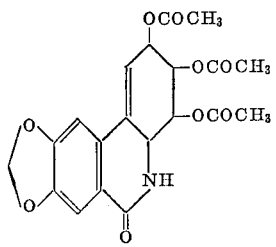

9. A compound according to claim 1, namely dihydrolycoricidin B of the formula:
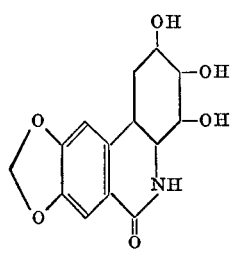
References Cited
UNITED STATES PATENTS
| 2,762,806 | 9/1956 | Steck | 260—279 |
| 3,267,107 | 8/1966 | Sallay | 260—287 |
| 3,291,801 | 12/1966 | Montgomery | 260—289 |
FOREIGN PATENTS
| 938,767 | 10/1963 | Great Britain | 260—236 |
DONALD G. DAUS, Primary Examiner
U.S. Cl. X.R.
71—94; 260—236, 289